United States Patent
Lee et al.

(10) Patent No.: US 7,340,270 B2
(45) Date of Patent: Mar. 4, 2008

(54) METHOD FOR RF OUTPUT POWER CONTROL OF A WIRELESS COMMUNICATION DEVICE

(75) Inventors: Chih-Fang Lee, TaiNan (TW); I-Ru Liu, Taipei (TW)

(73) Assignee: Acradyan Technology Corporation, Hsinchu (TW)

( * ) Notice: Subject to any disclaimer, the term of this patent is extended or adjusted under 35 U.S.C. 154(b) by 625 days.

(21) Appl. No.: 10/857,885

(22) Filed: Jun. 2, 2004

(65) Prior Publication Data

US 2005/0227723 A1    Oct. 13, 2005

(30) Foreign Application Priority Data

Apr. 7, 2004    (TW) .................................. 93109551

(51) Int. Cl.
*H04B 7/00*    (2006.01)
*H04Q 7/20*    (2006.01)
(52) U.S. Cl. .................... 455/522; 455/69; 455/571; 455/127.1; 370/311; 370/335; 370/342
(58) Field of Classification Search ............... 455/522, 455/571, 572, 574, 127.1–127.5, 343.1, 343.2, 455/69; 370/311, 335, 342
See application file for complete search history.

(56) References Cited

U.S. PATENT DOCUMENTS

| | | | |
|---|---|---|---|
| 5,594,946 A * | 1/1997 | Menich et al. | 455/522 |
| 6,341,215 B1 * | 1/2002 | Ozluturk | 455/69 |
| 6,434,365 B1 * | 8/2002 | Knutson et al. | 455/69 |
| 6,456,604 B1 * | 9/2002 | Lee et al. | 370/328 |
| 6,526,261 B1 * | 2/2003 | Takeuchi et al. | 455/69 |
| 7,089,434 B2 * | 8/2006 | Kuo | 713/300 |
| 2004/0106431 A1 * | 6/2004 | Laroia et al. | 455/552.1 |
| 2004/0203981 A1 * | 10/2004 | Budka et al. | 455/522 |

* cited by examiner

*Primary Examiner*—Lana Le
*Assistant Examiner*—Ping Y Hsieh
(74) *Attorney, Agent, or Firm*—Troxell Law Office, PLLC

(57) ABSTRACT

The present invention discloses a method for RF output power control of a wireless communication device by switching the wireless communication device between different modes according to a state parameter corresponding to a received beacon. These modes include a normal power mode for outputting a normal RF output power and a reduced-power mode for outputting a reduced RF output power. The reduced RF output power is less than the normal RF output power.

20 Claims, 2 Drawing Sheets

METHOD FOR RF OUTPUT POWER CONTROL OF A WIRELESS COMMUNICATION DEVICE

BACKGROUND OF THE INVENTION

1. Field of the Invention

The present invention generally relates to a method for RF output power control of a wireless communication device and, more particularly, to a method for output power control by switching the wireless communication device between different modes according to a state parameter corresponding to a received beacon.

2. Description of the Prior Art

In recent years, applications in fields such as mobile communications as well as wireless local area network (WLAN) have attracted considerable attention. For wireless communication devices such as mobile phones, base stations, wireless network interface cards and access points, and so forth, it is necessary to reduce power consumption so as to prevent ageing and degradation of the components. Especially, portable wireless communication devices require batteries as power supply; therefore, it is necessary for such devices to reduce power consumption so as to prolong the battery lifetime. Moreover, in order to prevent human from absorbing the electromagnetic waves, it is required that the RF energy of the nuisance radiation from the wireless communication devices must be conserved when the devices are not operating or operating at a short distance.

In view of the power consumption, most of the power is consumed by the transmitter of wireless communication devices when the transmitter is transmitting RF signals. Accordingly, the present invention provides a method for RF output power control of a wireless communication device so as to reduce power consumption and eliminate nuisance radiation on one hand and leave the link quality of signal transmission unaffected on the other.

SUMMARY OF THE INVENTION

In view of these problems, it is the primary object of the present invention to provide a method for RF output power control of a wireless communication device by switching different modes according to a state parameter corresponding to a received beacon.

In order to achieve the foregoing object, the present invention provides a method for RF output power control of a wireless communication device, comprising steps of:

switching a wireless communication device to a normal power mode so as to output a normal RF output power;

receiving a beacon; and switching the wireless communication device to a reduced power mode so as to output a reduced RF output power, wherein the reduced RF output power is no more than the normal RF output power.

Moreover, the wireless communication device is switched between the normal power mode and the reduced power mode according to a state parameter corresponding to the received beacon.

Other and further features, advantages and benefits of the invention will become apparent in the following description taken in conjunction with the following drawings. It is to be understood that the foregoing general description and following detailed description are exemplary and explanatory but are not to be restrictive of the invention. The accompanying drawings are incorporated in and constitute a part of this application and, together with the description, serve to explain the principles of the invention in general terms.

BRIEF DESCRIPTION OF THE DRAWINGS

The objects, spirits and advantages of the preferred embodiments of the present invention will be readily understood by the accompanying drawings and detailed descriptions, wherein.

DETAILED DESCRIPTION OF THE INVENTION

The present invention providing a method for RF output power control of a wireless communication device can be exemplified by the preferred embodiment as described hereinafter.

Figure 1:
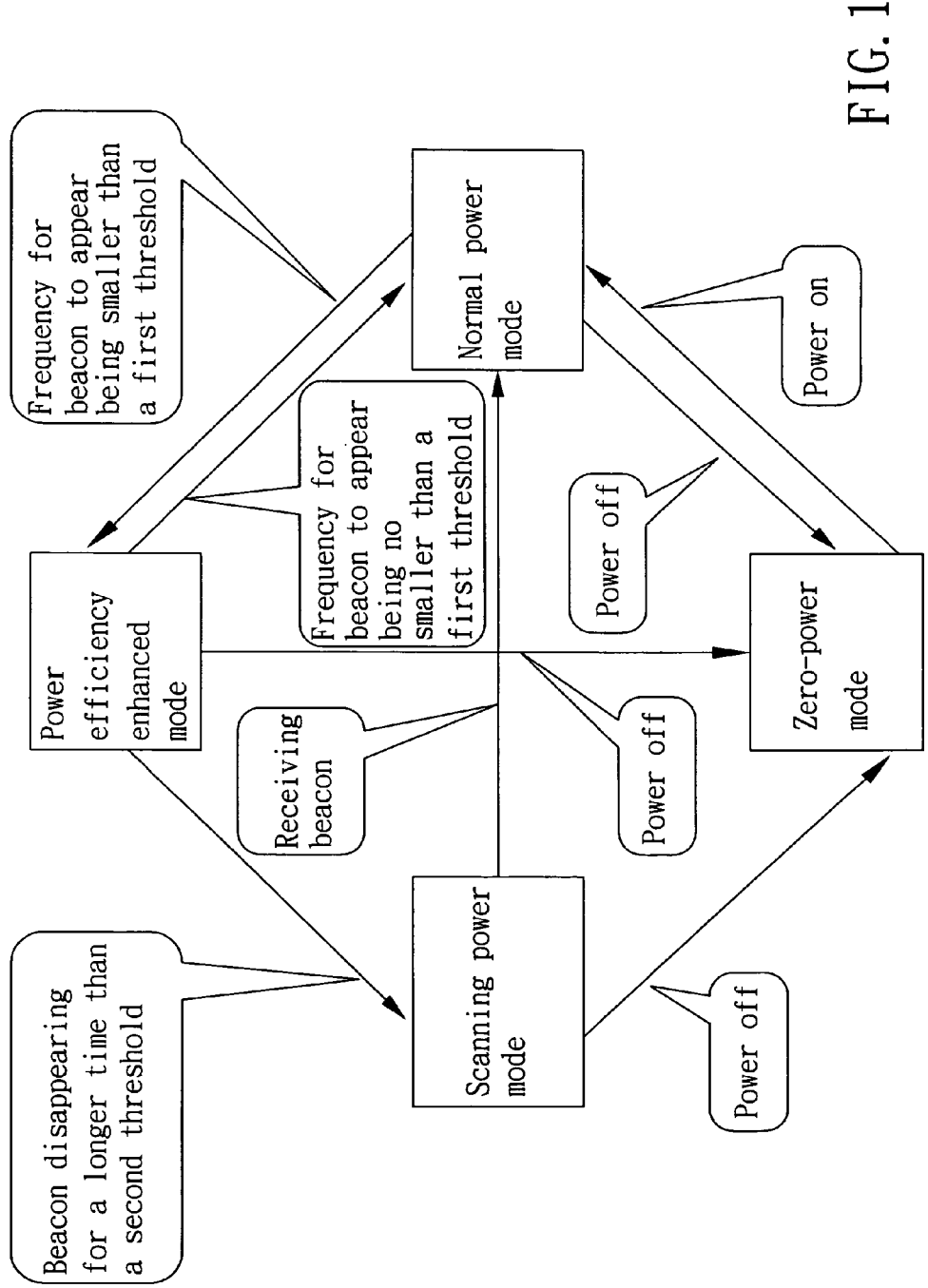
FIG. 1 is a schematic block diagram showing four power modes of a wireless communication device in accordance with one preferred embodiment of the present invention.

Please refer to FIG. 1, which is a schematic block diagram showing four power modes of a wireless communication device in accordance with one preferred embodiment of the present invention. As shown in FIG. 1, the wireless communication device is switched from a certain power mode to another power mode. The four power modes are described hereinafter:

(1) Normal power mode—which is active at normal operation. At normal power mode, a wireless communication device outputs a normal output power, which can be a pre-determined value. In one embodiment, the normal output power is determined to be the maximum output power for the wireless communication device so that the signals output from the wireless communication device can be received by other receiving devices as faraway as possible.

(2) Scanning power mode—also referred to as "standby power mode". At scanning power mode, a wireless communication device stops data transmitting and data receiving so that the output power is reduced to minimum to minimize power consumption. However, in order for the wireless communication device to transmit a beacon to a receiving station afar and let the receiving station be informed that the wireless communication device is still at operation, the wireless communication device has to have enough output power to transmit the beacon in each period of time. At scanning power mode, the wireless communication device outputs a scanning output power corresponding to the scanning power mode with the strength of the output power being between the maximum output power and the minimum output power of the wireless communication device. In one embodiment, the scanning output power versus time shows a pre-determined periodical function. The periodical function can be a sine function, a saw-tooth function, or even a pseudo random function.

(3) Efficiency-enhanced mode—also referred to as "semi-standby power mode". At efficiency-enhancing mode, a wireless communication device does not transmit and receive power as frequently as the normal power mode, and thus the output power is reduced and power consumption is reduced. In one embodiment, the wireless communication device outputs a corresponding controlled output power. In order to enhance the efficiency of the output power, the controlled output power is set up according to the estimated propagation loss between the wireless communication device and a destination device. Furthermore, the controlled output power is further adjusted according to the fact whether the wireless communication device re-sends the signal.

(4) Zero-power mode. The power supply is off and thus a wireless communication device does not output any power.

The wireless communication device is switched between four modes as shown in FIG. 1. To begin with, no matter which mode the wireless communication device is at, it is switched to the zero-power mode when the power supply is turned off. The wireless communication device is switched to the normal power mode after the power is turned on.

Moreover, the wireless communication device is switched between different modes (i.e., normal power mode, scanning power mode, and efficiency-enhanced mode) according to a state parameter (such as appearing frequency, disappearing time) corresponding to a received beacon. The beacon refers to a specific signal for request and response between wireless communication devices so that one device informs the other device of its present state, thereby enabling follow-up data communication. The switching procedure is described hereinafter with reference to FIG. 1:

(1) The wireless communication device is switched between the normal power mode and the efficiency-enhanced mode according to the appearing frequency and a first pre-determined threshold of a received beacon. When the wireless communication device is at the normal power mode and the appearing frequency of a beacon is smaller than the first pre-determined threshold, it means that the working load of the wireless communication device is not heavy and the wireless communication device is then switched to the efficiency-enhanced mode. When the wireless communication device is at the efficiency-enhanced mode and the appearing frequency of the beacon is not less than the first pre-determined threshold, it indicates that the working load of the wireless communication device is heavy and the wireless communication device is then switched to the normal power mode.

(2) When the wireless communication device is at the efficiency-enhanced mode and the disappearing time of the beacon is larger than the second pre-determined threshold, it means that the working load of the wireless communication device is not heavy and the wireless communication device is then switched to the normal power mode. When the wireless communication device is at the scanning power mode and a new beacon is received, it indicates that the wireless communication device is going to perform data communication and the wireless communication device is then switched to the normal power mode. In another embodiment, the wireless communication device can also be switched to the efficiency-enhanced mode.

Hereinafter, the controlled output power of the efficiency-enhanced mode is further described. As mentioned above, the controlled output power is determined according to an estimated propagation loss from the wireless communication device to a destination device. Therefore, the estimated propagation loss is taken into consideration such that the signals can be transmitted with maintained power while being unaffected by the propagation loss.

In the embodiment shown in FIG. 1, the controlled output power is obtained from an effective isotropic radiated power (EIRP) plus an estimated propagation loss minus an antenna gain, i.e., $$\text{controlled output power} = \text{EIRP} + \text{estimated propagation loss} - \text{antenna gain} \quad (1\text{-}1)$$

In 1-1, the effective isotropic radiated power is determined according to the data rate setting, multiplex type, spreading type, coding type and modulation type of the wireless communication device. The data rate setting is the most dominant factor. A table representing the relation between these factors and the EIRP can be stored in the wireless communication device for reference.

In the present embodiment, it is assumed that the channel between the wireless communication device and the destination device is time-invariant and reciprocal. Therefore, the propagation loss along the transmitting path is equal to that along the receiving path. For simplicity, the estimated propagation loss in 1-1 can be obtained from a specified propagation loss along the receiving path minus a reference propagation loss, i.e., $$\begin{aligned}
\text{estimated propagation loss} &= \text{specified propagation loss} - \text{reference propagation loss} \\
&= [ERP + \text{recieve antenna gain} - (RSS)] - \\
&\quad [ERP_{ref} + \text{reference recieve antenna gain} - RSS_{ref}] \\
&= (ERP - ERP_{ref}) + (\text{recieve antenna gain} - \text{reference recieve antenna gain}) + \\
&\quad (RSS - RSS_{ref}) \\
&\cong (\text{recieve antenna gain} - \text{reference recieve antenna gain}) + (RSS - RSS_{ref})
\end{aligned} \quad (1\text{-}2)$$

In 1-2, the receive antenna gain is referred to the antenna by which the host device is receiving signals. RSS refers to measured received signal strength of the host device. The reference values (with an index ref) are determined mean values for a plurality of devices of the same type. It is noted that the effective radiated power of the destination device is assumed to be equal to the reference effective radiated power, i.e., $ERP = ERP_{ref}$.

Moreover, as the above-mentioned EIRP is determined, the propagation loss has been considered and thus will not be considered again when the estimated propagation loss is to be determined.

Moreover, in the embodiment shown in FIG. 1, the wireless communication device has two diversity antennae. The antenna gain in 1-1 is a gain of transmit antenna. However, since the channel is time-invariant and reciprocal, the receive antenna is used to transmit signals and the transmit antenna gain is then equal to the receive antenna gain. Therefore, the antenna gain in 1-1 can be obtained by using the gain of the receive antenna from which a higher S/N ratio is measured.

Furthermore, in the embodiment shown in FIG. 1, the wireless communication device determines and optimizes the controlled output power according to the fact whether the frame is resent. The frame is the fundamental unit of information carriage in all modern communication networks. The aforementioned beacon is one of frame types.

Figure 2:
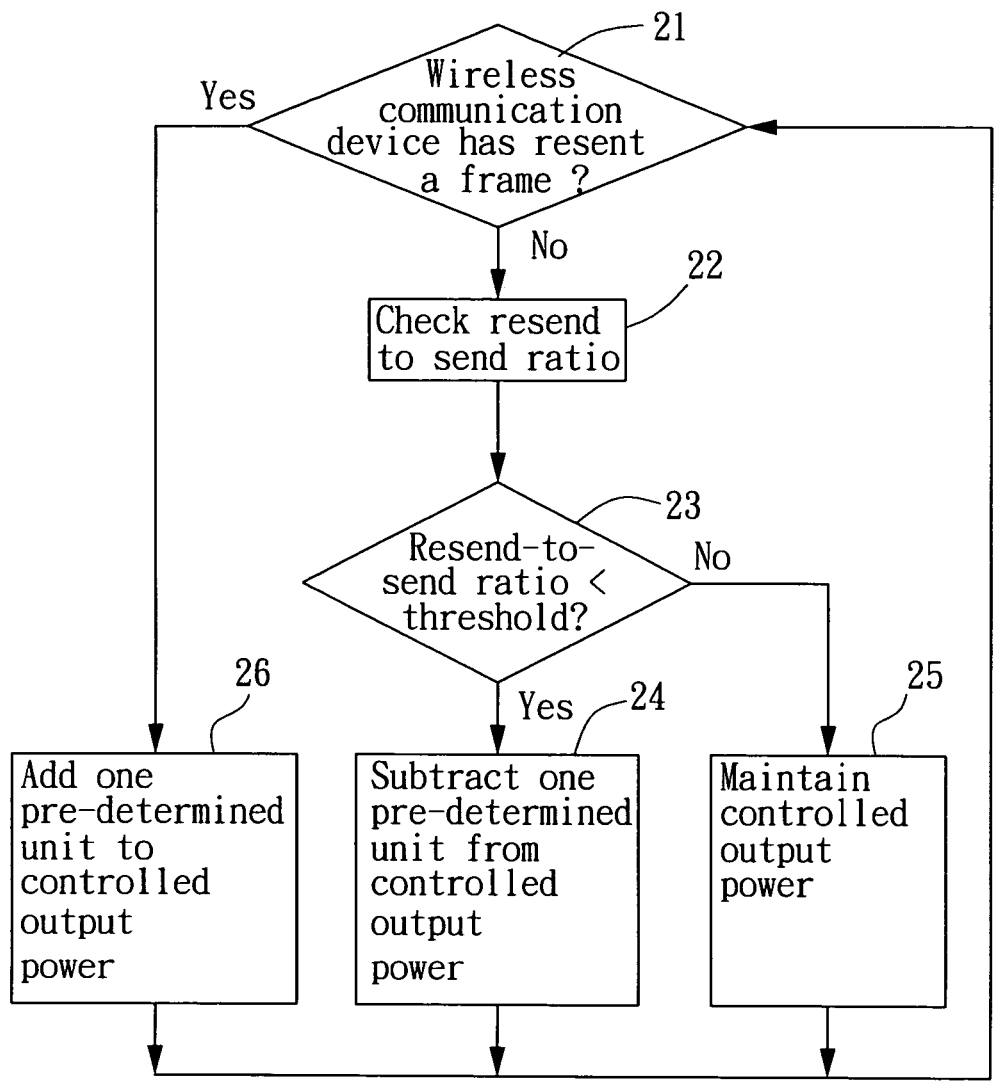
FIG. 2 is a flow chart showing a method for optimizing the controlled output power of a wireless communication device in accordance with the present invention.

Please refer to FIG. 2, which is a flow chart showing a method for optimizing the controlled output power of a wireless communication device in accordance with the present invention. The method comprises steps of:

Step 21: determining whether a wireless communication device has resent a frame; proceeding with Step 26 if yes and Step 22 otherwise;

Step 22: determining a resend-to-send ratio of the wireless communication device;

Step 23: determining whether the resend-to-send ratio is less than a threshold; proceeding with Step 24 if yes and Step 25 otherwise;

Step 24: subtracting one pre-determined unit from the controlled output power and returning to Step 21;

Step 25: maintaining the controlled output power and returning to Step 21; and

Step 26: adding the pre-determined unit to the controlled output power and returning to Step 21.

The wireless communication device resends a frame when the frame is not properly received by a destination device. It is not limited in the present invention what condition the wireless communication device has met before it decides to resend a frame. It may occur when the device has received a negative-acknowledgement frame, or has not received an acknowledgement frame for a period, or other conditions. When wireless communication device is determined that the frame is to be resent, the output power of the wireless communication device has to be increased so as to enhance link quality and range. Therefore, after the wireless communication device is determined to have resent the frame, the procedure goes to Step 26 and adds a pre-determined unit to the controlled output power. The pre-determined unit is set according to the requirement of the wireless communication device and the control resolution and coverage of power amplifier installed therein.

In Step 21, if the wireless communication device is determined not to resend the frame, the procedure proceeds with Step 22 and Step 23 and the resend-to-send ratio is thus determined and compared to the threshold. The resend-to-send ratio is the times the wireless communication device resends a frame to the times the wireless communication device sends a frame, i.e., the percentage of the resent frames out of the sent frames. If the resend-to-send ratio is less than the threshold, it means that the destination device has properly received the frames and thus the controlled output power can be subtracted by a pre-determined unit so as to reduce power consumption, as described in Step 24. If the resend-to-send ratio is not less than the threshold, it means that the destination device does not have received the frames properly and thus the controlled output power must be maintained, as described in Step 25. The threshold is determined according to the type of the wireless communication device.

Although this invention has been disclosed and illustrated with reference to particular embodiments, the principles involved are susceptible for use in numerous other embodiments that will be apparent to persons skilled in the art. This invention is, therefore, to be limited only as indicated by the scope of the appended claims.

What is claimed is:

1. A method for RF output power control, comprising steps of:
switching a wireless communication device to a normal power mode so as to output a normal RF output power;
receiving a beacon; and
switching said wireless communication device to a reduced power mode so as to output a reduced RF output power,
wherein said reduced RF output power is no more than said normal RF output power; wherein said wireless communication device is switched between said normal power mode and said reduced power mode according to a state parameter corresponding to said received beacon,
wherein said reduced power mode comprises a scanning power mode and an efficiency-enhanced mode, said reduced RF output power comprises a corresponding scanning output power and a corresponding controlled output power, said scanning output power being between a maximum output power and a minimum output power of said wireless communication device, said controlled output power is determined according to a fact whether said wireless communication device has resent a frame,
wherein one pre-determined unit is added to said controlled output power when said wireless communication device resends said frame,
wherein said controlled output power is adjusted according to a re-send-to-send ratio when said wireless communication device does not resend said frame, wherein said resend-to-send ratio is determined according to a number of times said wireless communication device resends said frame and a number of times said wireless communication device sends said frame.

2. The method for RF output power control as recited in claim 1, wherein said normal RF output power-is a pre-determined maximum output power of said wireless communication device.

3. The method for RF output power control as recited in claim 1, further comprising: switching said wireless communication device to a zero-power mode when a power supply of said wireless communication device is turned off.

4. The method for RF output power control as recited in claim 3, further comprising: switching said wireless communication device to said normal power mode when said power supply of said wireless communication device is turned on.

5. The method for RF output power control as recited in claim 1, wherein said wireless communication device is switched between said normal power mode and said reduced power mode according to a comparison result of said state parameter and a threshold.

6. The method for RF output power control as recited in claim 5, wherein said state parameter is an appearing frequency of said received beacon of said wireless communication device.

7. The method for RF output power control as recited in claim 6, further comprising: switching said wireless communication device to said reduced power mode when said wireless communication device is at said normal power mode and said appearing frequency of said received beacon is smaller than said threshold.

8. The method for RF output power control as recited in claim 7, further comprising: switching said wireless communication device to said normal power mode when said wireless communication device is at said reduced power mode and said appearing frequency of said received beacon is not smaller than said threshold.

9. The method for RF output power control as recited in claim 1, wherein said scanning output power is corresponding to a pre-determined periodical function.

10. The method for RF output power control as recited in claim 1, wherein said controlled output power is set up according to an estimated propagation loss between said wireless communication device and a destination device.

11. The method for RF output power control as recited in claim 10, wherein said state parameter is a disappearing time of said received beacon of said wireless communication device.

12. The method for RF output power control as recited in claim 11, further comprising: switching said wireless communication device to said scanning power mode when said wireless communication device is at said efficiency-enhanced mode and said disappearing time of said received beacon is larger than said threshold.

13. The method for RF output power control as recited in claim 12, further comprising: switching said wireless communication device to said normal power mode when said wireless communication device is at said scanning power mode and a new beacon is received.

14. The method for RF output power control as recited in claim 10, wherein said estimated propagation loss is obtained from an antenna gain minus a reference antenna gain minus a difference between a received signal strength and a reference received signal strength.

15. The method for RF output power control as recited in claim 14, wherein said controlled output power is obtained from an effective isotropic radiated power (EIRP) plus said estimated propagation loss minus said antenna gain.

16. The method for RF output power control as recited in claim 15, wherein said effective isotropic radiated power (EIRP) is determined according to a data rate setting of said wireless communication device.

17. The method for RF output power control as recited in claim 16, wherein said effective isotropic radiated power is determined according to a multiplex type, a spreading type and a modulation type of said wireless communication device.

18. The method for RF output power control as recited in claim 15, wherein said antenna gain is a gain of a diversity antenna with higher S/N ratio.

19. The method for RF output power control as recited in claim 1, wherein said resend-to-send ratio is said number of times said wireless communication device resends said frame divided by said number of times said wireless communication device sends said frame, and said controlled output power is subtracted by said pre-determined unit when said wireless communication device does not resend said frame and said re-send-to-send ratio is smaller than a pre-determined threshold.

20. The method for RF output power control as recited in claim 19, wherein said controlled output power maintains when said wireless communication device does not resend said frame and said re-send-to-send ratio is not less than said pre-determined threshold.

* * * * *